(12) United States Patent
Fiser et al.

(10) Patent No.: US 9,905,054 B2
(45) Date of Patent: *Feb. 27, 2018

(54) CONTROLLING PATCH USAGE IN IMAGE SYNTHESIS

(71) Applicant: Adobe Systems Incorporated, San Jose, CA (US)

(72) Inventors: Jakub Fiser, Prague (CZ); Ondrej Jamriška, Prague (CZ); Michal Lukáč, Prague (CZ); Elya Shechtman, Seattle, WA (US); Paul J. Asente, Redwood City, CA (US); Jingwan Lu, Santa Clara, CA (US); Daniel Sýkora, Prague (CZ)

( * ) Notice: Subject to any disclaimer, the term of this patent is extended or adjusted under 35 U.S.C. 154(b) by 8 days.

This patent is subject to a terminal disclaimer.

(21) Appl. No.: 15/178,237

(22) Filed: Jun. 9, 2016

(65) Prior Publication Data

US 2017/0358143 A1    Dec. 14, 2017

(51) Int. Cl.
*G06T 19/20* (2011.01)
*G06T 15/02* (2011.01)
*G06K 9/62* (2006.01)
*G06T 15/50* (2011.01)

(52) U.S. Cl.
CPC ............ *G06T 19/20* (2013.01); *G06K 9/6204* (2013.01); *G06T 15/02* (2013.01); *G06T 15/50* (2013.01); *G06T 2219/2012* (2013.01); *G06T 2219/2024* (2013.01)

(58) Field of Classification Search
CPC .......................................... G06T 15/00–15/87
See application file for complete search history.

(56) References Cited

U.S. PATENT DOCUMENTS

| 6,919,903 B2 | 7/2005 | Freeman et al. |
| 9,317,773 B2 | 4/2016 | Shechtman et al. |
| 9,576,351 B1 | 2/2017 | Barzel et al. |

(Continued)

FOREIGN PATENT DOCUMENTS

CN    104346789    2/2015

OTHER PUBLICATIONS

Barnes,"PatchMatch: A Randomized Correspondence Algorithm for Structural Image Editing", ACM SIGGRAPH 2009 Papers (New Orleans, Louisiana, Aug. 3-7, 2009), Aug. 3, 2009, 10 pages.

(Continued)

*Primary Examiner* — Daniel Hajnik
(74) *Attorney, Agent, or Firm* — Wolfe-SBMC (57) ABSTRACT

Techniques for controlling patch-usage in image synthesis are described. In implementations, a curve is fitted to a set of sorted matching errors that correspond to potential source-to-target patch assignments between a source image and a target image. Then, an error budget is determined using the curve. In an example, the error budget is usable to identify feasible patch assignments from the potential source-to-target patch assignments. Using the error budget along with uniform patch-usage enforcement, source patches from the source image are assigned to target patches in the target image. Then, at least one of the assigned source patches is assigned to an additional target patch based on the error budget. Subsequently, an image is synthesized based on the source patches assigned to the target patches.

20 Claims, 9 Drawing Sheets

(56) References Cited

U.S. PATENT DOCUMENTS

| | | | |
|---|---|---|---|
| 2010/0046829 A1* | 2/2010 | Mahajan | G06K 9/40 382/159 |
| 2011/0292075 A1 | 12/2011 | Sukenori | |
| 2014/0267350 A1* | 9/2014 | Kass | G06T 15/02 345/589 |
| 2017/0358128 A1 | 12/2017 | Fiser et al. | |

OTHER PUBLICATIONS

Barnes,"PatchTable: Efficient Patch Queries for Large Datasets and Applications", ACM Transactions on Graphics 34, 4, 97, Aug. 2015, 10 pages.

Barnes,"The Generalized PatchMatch Correspondence Algorithm", European Conference on Computer Vision—Retrieved from <http://gfx.cs.princeton.edu/pubs/Barnes_2010_TGP/generalized_pm.pdf> on Sep. 9, 2010, Sep. 2010, 14 pages.

Benard,"A Dynamic Noise Primitive for Coherent Stylization", Eurographics Symposium on Rendering, vol. 29 (2010), No. 4, May 31, 2010, 10 pages.

Benard,"Stylizing animation by example", ACM Transactionson Graphics, Sep. 11, 2013, 12 pages.

Blinn,"Texture and Reflection in Computer Generated Images", Communications of the ACM 19, 10, 1976, 6 pages.

Bousseau,"Interactive watercolor rendering with temporal coherence and abstraction", In International Symposium on Non-Photorealistic Animation and Rendering,, May 2006, 9 pages.

Chen,"High quality solid texture synthesis using position and index histogram matching", The Visual Computer 26, Sep. 16, 2010, 11 pages.

Curtis,"Computer-Generated Watercolor", In SIGGRAPH Conference Proceedings, 1997, 10 pages.

Darabi,"Image Melding: Combining Inconsistent Images using Patch-based Synthesis", ACM Transactions on Graphics 31, 4, 82, Aug. 2012, 10 pages.

Diamanti,"Synthesis of Complex Image Appearance from Limited Exemplars", ACM Transactions on Graphics 34, 2, 22, Feb. 2015, 13 pages.

Fiser,"Color Me Noisy: Example-based Rendering of Hand-colored Animations with Temporal Noise Control", Eurographics Symposium on Rendering vol. 33 (2014), No. 4, 2014, 10 pages.

Gatys,"A Neural Algorithm of Artistic Style", Computer Vision and Pattern Recognition, Sep. 2, 2016, 16 pages.

Haeberli,"Paint by Numbers: Abstract Image Representations", Computer Graphics, vol. 24, No. 4, Aug. 1990, pp. 207-214.

Han,"Fast Example-based Surface Texture Synthesis via Discrete Optimization", The Visual Computer 22, 9-11, Aug. 26, 2006, 7 pages.

Hashimoto,"Creating Various Styles of Animations Using Example-Based Filtering", In Proceedings of Computer Graphics International Jul. 2003, 7 pages.

Heckbert,"Adaptive Radiosity Textures for Bidirectional Ray Tracing", Computer Graphics, vol. 24, No. 4, Aug. 1990, 10 pages.

Hertzmann,"Image Analogies", Proceedings of SIGGRAPH 2001, 2001, 14 pages.

Jamriska,"LazyFluids: Appearance Transfer for Fluid Animations", ACM Transactions on Graphics 34, 4, 92, Apr. 2015, 10 pages.

Kajiya,"The Rendering Equation", Proceedings of SIGGRAPH 86, vol. 20, No. 4, Dallas, TX, USA, Aug. 18-22, 1986, Aug. 18, 1986, pp. 143-150.

Kaspar,"Self Tuning Texture Optimization", Computer Graphics Forum 34, 2, Jun. 22, 2015, 11 pages.

Kopf,"Solid Texture Synthesis from 2D Exemplars", ACM Transactions on Graphics 26, 3, 2, Aug. 5, 2007, 9 pages.

Kwatra,"Texture Optimization for Example-based Synthesis", ACM Trans. Graph., vol. 24, No. 3, 2005, p. 795-802.

Kyprianidis,"State of the "Art": A Taxonomy of Artistic Stylization Techniques for Images and Video", IEEE Transactions on Visualization and Computer Graphics 19, 5, Jul. 2013, 21 pages.

Lefebvre,"Appearance-space texture synthesis", ACM Transactions on Graphics 25, 3, Jul. 30, 2006, 8 pages.

Lu,"Combining Sketch and Tone for Pencil Drawing Production", In Proceedings of International Symposium on Non-Photorealistic Animation and Rendering, Jun. 2012, 9 pages.

Newson,"Video Inpainting of Complex Scenes", SIAM Journal of Imaging Science 7, 4, Mar. 18, 2015, 27 pages.

Noris,"Temporal Noise Control for Sketchy Animation", In Proceedings of International Symposium on Non-photorealistic Animation and Renderin, 2011, 6 pages.

Rong,"Jump Flooding in GPU with Applications to Voronoi Diagram and Distance Transform", in/3D '06: Proceedings of the 2006 symposium on Interactive 3D graphics and games, ACM, New York, NY, USA, 2006, 9 pages.

Rosenberger,"Layered Shape Synthesis: Automatic Generation of Control Maps for Non-Stationary Textures", ACM Transactions on Graphics, vol. 28, No. 5, Article 107, Dec. 2009, 10 pages.

Salisbury,"Orientable Textures for Image-Based Pen-and-Ink Illustration", In SIGGRAPH Conference Proceedings, Jun. 1997, 6 pages.

Simakov,"Summarizing Visual Data Using Bidirectional Similarity", In Proceedings of CVPR 2008, Jun. 23, 2008, 8 pages.

Simonyan,"Very deep convolutional networks for large-scale image recognition", In Journal of Computing Research Repository, Sep. 2014, 14 pages.

Sloan,"The Lit Sphere: A Model for Capturing NPR Shading from Art", In Proceedings of Graphics Interface, Jun. 2001, 8 pages.

Tu,"Image Parsing: Unifying Segmentation, Detection, and Recognition", Proceedings of the Ninth IEEE International Conference on Computer Vision (ICCV 2003) 2-Volume Set, 2003, 8 pages.

Van"From Dust till Drawn: A Real-time Bidirectional Pastel Simulation", The Visual Computer, vol. 23 (Nos. 9-11), 2007, 8 pages.

Wang,"Efficient Example-Based Painting and Synthesis of 2D Directional Texture", IEEE Transactions on Visualization and Computer Graphics 10, May 2004, pp. 266-277.

Wei,"Inverse Texture Synthesis", ACM Trans. Graph 27, 3, 2008, 10 pages.

Wexler,"Space-Time Completion of Video", IEEE Transactions on Pattern Analysis and Machine Intelligence, vol. 29, No. 3, Mar. 2007, 14 pages.

Winnemoller,"XDoG: An eXtended difference-of-Gaussians compendium including advanced image stylization", Computers & Graphics 36, 6, 740-753., Mar. 2012, 15 pages.

Xing,"Autocomplete Hand-drawn Animations", ACM Transactions on Graphics 34, 6, 169., Nov. 2015, 11 pages.

Xing,"Autocomplete Painting Repetitions", ACM Transactions on Graphics, 2014, 13 pages.

Zeng,"From Image Parsing to Painterly Rendering", ACM Transactions on Graphics 29, 1, 2, Dec. 2009, 11 pages.

Zeng,"Hallucinating Stereoscopy from a Single Image", Computer Graphics Forum 34, 2, May 2015, 12 pages.

Zhao,"Portrait Painting Using Active Templates", In Proceedings of International Symposium on Non-Photorealistic Animation and Rendering,, Aug. 2011, 7 pages.

"Pre-Interview Communication", U.S. Appl. No. 15/178,072, dated Jun. 28, 2017, 3 pages.

"Notice of Allowance", U.S. Appl. No. 15/178,072, dated Sep. 26, 2017, 5 pages.

Nguyen,"3D Material Style Transfer", Computer Graphics Forum vol. 31 No. 2pt2 Blackwell Publishing Ltd., 2012, 8 pages.

"Combined Search and Examination Report", GB Application No. 1706425.4, Sep. 27, 2017, 5 pages.

"Combined Search and Examination Report", GB Application No. 1706421.3, Oct. 18, 2017, 5 pages.

"Corrected Notice of Allowance", U.S. Appl. No. 15/178,072, Dec. 18, 2017, 2 pages.

* cited by examiner

```
┌─────────────────────────────────────────────────────────┐
│ Obtain a source image and a target image each comprising a multi-
│ channel image that includes at least a style channel and multiple light
│ path expression (LPE) channels having light propagation information
│                            702                           │
└─────────────────────────────────────────────────────────┘
                              │
                              ▼
┌─────────────────────────────────────────────────────────┐
│ Synthesize the style channel of the target image to mimic a stylization of
│ individual illumination effects from the style channel of the source image
│                            704                           │
│  ┌───────────────────────────────────────────────────┐  │
│  │  Guide the synthesizing of the style channel of the target
│  │  image based on the light propagation information
│  │                        706                         │  │
│  └───────────────────────────────────────────────────┘  │
│                            │                             │
│                            ▼                             │
│  ┌───────────────────────────────────────────────────┐  │
│  │ Transfer the stylization of individual illumination effects from the style
│  │ channel of the source image to the style channel of the target image
│  │ based on the guiding of the light propagation information
│  │                        708                         │  │
│  └───────────────────────────────────────────────────┘  │
│                            │                             │
│                            ▼                             │
│  ┌───────────────────────────────────────────────────┐  │
│  │ Generate the style channel of the target image, based on the
│  │ transferring of the stylization of individual illumination effects,
│  │ for display of the target image via a display device
│  │                        710                         │  │
│  └───────────────────────────────────────────────────┘  │
└─────────────────────────────────────────────────────────┘
```

CONTROLLING PATCH USAGE IN IMAGE SYNTHESIS

BACKGROUND

Conventional techniques for stylizing synthetic renderings of virtual objects to generate a hand-crafted artistic appearance suffer from various limitations that cause errors (e.g., artifacts) in resulting stylizations. For instance, some conventional techniques rely primarily on color information to determine a stylized appearance, but the color information fails to distinguish among different regions having similar colors. Other techniques rely primarily on normals that are useful for a simple shading scenario having a distant light source, but fail to correctly determine locations of some advanced lighting effects, such as shadows or glossy reflections caused by a relatively close light source.

Additional limitations in the conventional techniques generally tend to distort high-level textural features, such as individual brush strokes, or excessively reuse a subset of patches of pixels from a source image to stylize a target image. These additional limitations can result in a distinct wash-out effect manifesting as artificial repetitions or homogeneous areas that do not correlate with the stylized appearance. Because of these limitations, an image synthesized using conventional techniques generally includes artifacts that provide a distinctively synthetic appearance, which decreases the fidelity of the synthesized image and fails to accurately simulate real artwork of an artist.

SUMMARY

This Summary introduces features and concepts of illumination-guided example-based stylization of three-dimensional (3D) renderings, which are further described below in the Detailed Description and/or shown in the Figures. This Summary should not be considered to describe essential features of the claimed subject matter, nor used to determine or limit the scope of the claimed subject matter.

Techniques are described for controlling patch-usage in image synthesis. In implementations, a curve is fitted to a set of sorted matching errors that correspond to potential source-to-target patch assignments between a source image and a target image. The matching errors represent a degree of correlation between a source patch (e.g., group of pixels) in the source image and a target patch in the target image. Using the fitted curve, an error budget is determined to represent a constraint on the usage of source patches to avoid enforcing the use of patches that can cause visual artifacts in a synthesized image. In an example, the error budget is usable to identify feasible patch assignments from the potential source-to-target patch assignments. By using the error budget along with uniform patch-usage enforcement, source patches from the source image are assigned to target patches in the target image. Then, at least one of the assigned source patches is assigned to an additional target patch based on the error budget to adapt to content of the target image. Subsequently, an image is synthesized based on the source patches assigned to the target patches.

The techniques described herein ensure that source patches are used equitably during image synthesis, which reduces artifacts and preserves both textural richness and overall structure of a target scene without tedious parameter tuning. Further, the techniques described herein provide adaptive utilization enforcement, which automatically balances utilization with an appearance-based error to produce a high quality rendered image stylization that is visually rich and faithful to the exemplar style.

BRIEF DESCRIPTION OF THE DRAWINGS

Implementations of illumination-guided example-based stylization of 3D renderings are described with reference to the following Figures. Entities represented in the Figures may be indicative of one or more entities and thus reference may be made interchangeably to single or plural forms of the entities in the discussion. The same numbers may be used throughout to reference like features and components that are shown in the Figures.

DETAILED DESCRIPTION

Overview

Conventional techniques used to stylize synthetic renderings of three-dimensional (3D) scenes are inefficient due to a variety of limitations. For instance, these conventional techniques rely primarily on color information or normals to determine a stylized appearance. Reliance on the color information, however, fails to distinguish among different regions having similar colors. Additionally, using normals fails to correctly determine locations of some lighting effects caused by a light source that is not infinitely distant. Further, high-level textural features are frequently distorted using these conventional techniques. These and other limitations in the conventional techniques produce artifacts in resulting stylizations, such as over-smoothing and repetition. Artifacts decrease the fidelity of the synthesized image and fail to accurately simulate the artist's style.

Accordingly, techniques are described in the following for illumination-guided example-based stylization of 3D renderings. These techniques provide improved results with less artifacts (e.g., distortions in an image) and with accurate representation of the artist's style. In implementations, a 3D scene containing illumination effects that may subsequently occur in target scenes is created. One example includes a simple rendering of a sphere on a table, using global illumination rendering techniques that add realistic lighting to the scene. This rendering can allow extension of highlights and shading to additional illumination effects, such as soft shadows, color bleeding, and glossy reflections.

Then, a stylized version of the rendering is created. For example, an artist hand paints an artistically stylized version of the rendering in a painting that is roughly aligned with the rendering. The painting and the rendering, as a pair, are used as an exemplar (e.g., source image). A target scene is then created with lighting effects substantially matching lighting effects of the rendering of the sphere on the table. In implementations, the target scene is different than the rendering and can include a relatively higher level of complexity of structure, surface geometry, scenery, shadows, illumination effects, and so on, in comparison to the rendering of the sphere. Subsequently, a style of the painting (e.g., hand-painted appearance) is transferred to the target scene, thereby preserving the artist's stylization of individual illumination effects in the painting. Using the target scene with the transferred style, a new image is synthesized. The new image thus includes an artistically stylized version of the target scene according to the artist's painting style. In this way, the new image appears to have been painted by the artist.

The transfer of the artistic stylization from the painting to the target scene is performed using Light Path Expression (LPE) channels. LPE channels are used to gain insight into light-scene interactions as seen in image space. By isolating prominent global illumination effects, information is obtained that describes how a real-life scene would appear to an artist. This information is then used during a matching phase of the image synthesis to reduce artifacts in resulting stylizations and accurately transfer the artist's style to the target scene. In this way, illumination effects associated with shape and spatial relationship cues, such as specular highlights, shadows, or diffuse interreflections, are stylized consistently with the artist's intent.

In implementations, the synthesis of the new image is performed using multi-channel images of the exemplar and the target. For instance, a multi-channel image includes multiple LPE channels having the illumination information described above, a full render channel, and a style channel having the artistic stylization. Initially, the style channel of the target is empty. The goal, however, is to fill the style channel of the target with patches from the style channel of the exemplar.

The techniques described herein reduce artifacts and preserve both textural richness and overall structure of the target scene without tedious parameter tuning. The techniques also enable high quality rendered image stylization that is visually rich and faithful to the exemplar style to be produced by providing adaptive utilization enforcement that automatically balances patch utilization with an appearance-based error.

As used herein, the term "artifact" is representative of undesired or unintended alterations in data introduced by a digital process. An example of an artifact includes a distortion in an image caused by a limitation or malfunction in hardware or software used to produce the image. As used herein, artifacts can include incorrect colors or highlights, lack of shadows or glossy reflections, distortions in textural features, wash-out effect, over-smoothing, visual structure breakdown, repetition, and so on. Accordingly, the term "artifact" includes a variety of visual errors produced during image synthesis.

As used herein, the term "stylization" may refer to a modification that causes conformity to a particular style, as of representation or treatment in art. For example, an artist may paint a scene using particular brush strokes and/or colors to emphasize different lighting effects. Accordingly, the stylization of a scene represents a wide variety of illumination effects in accordance with an artistic style.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Finally, an example system and device are described that are operable to use the techniques and systems described herein in accordance with one or more implementations.

Example Environment

Figure 1:
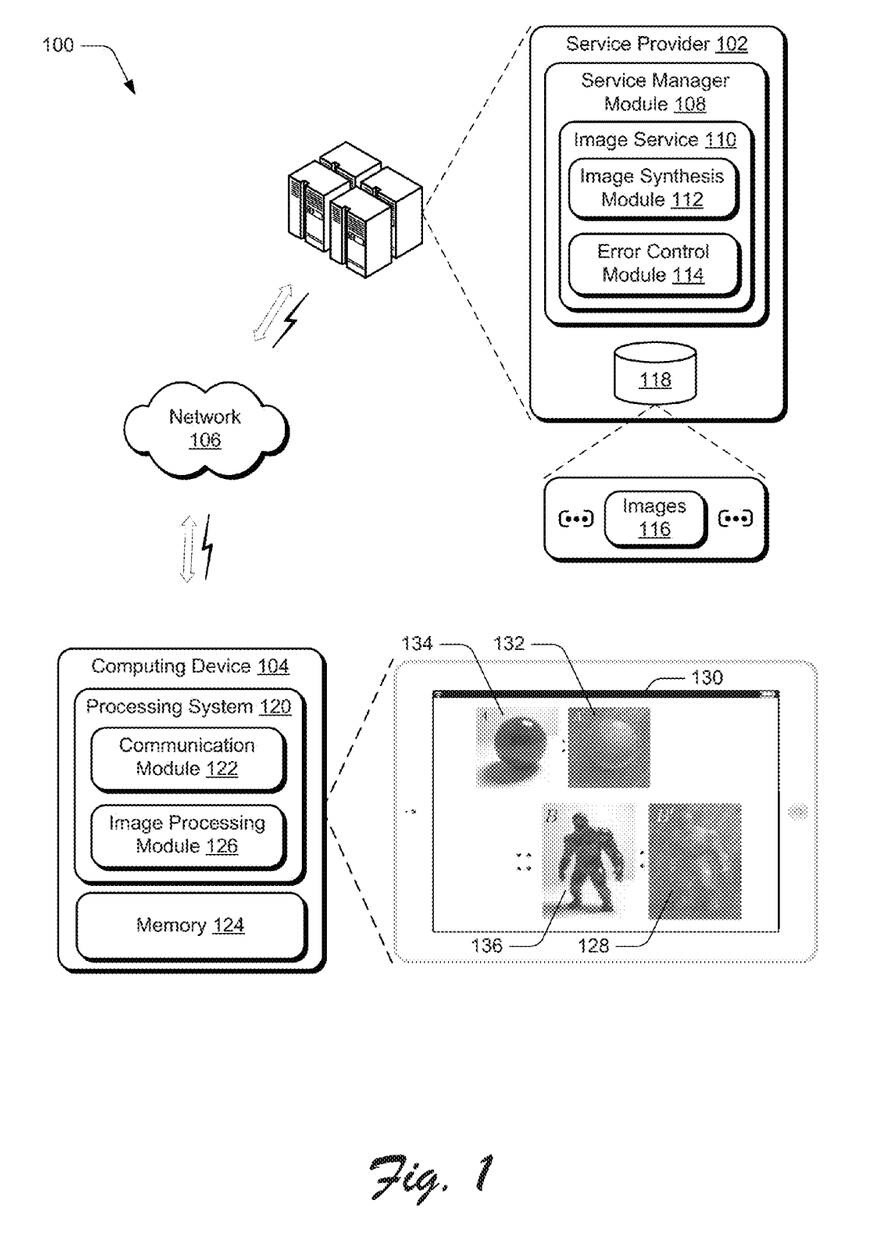
FIG. 1 illustrates an example environment in which techniques for illumination-guided example-based stylization of 3D renderings are implemented.

FIG. 1 is an illustration of an environment 100 in which techniques for illumination-guided example-based stylization of 3D renderings can be implemented. The illustrated environment 100 includes a service provider 102 and a computing device 104 that are communicatively coupled via a network 106. Functionality represented by the service provider 102 may be performed by a single entity, may be divided across other entities that are communicatively coupled via the network 106, or any combination thereof. Thus, the functionality represented by the service provider 102 can be performed by any of a variety of entities, including a cloud-based service, an enterprise hosted server, or any other suitable entity.

Computing devices that are used to implement the service provider 102 or the computing device 104 may be configured in a variety of ways. Computing devices, for example, may be configured as a desktop computer, a laptop computer, a mobile device (e.g., assuming a handheld configuration such as a tablet or mobile phone), and so forth. Additionally, a computing device may be representative of a plurality of different devices, such as multiple servers of the service provider 102 utilized by a business to perform operations "over the cloud" as further described in relation to FIG. 9.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be representative of multiple networks.

The service provider 102 is representative of functionality to provide one or more network-based services. The services are managed by a service manager module 108 to support a variety of different functionality. The services (e.g., web services), for instance, may be configured to support an image service 110. The image service 110 is configured to provide image processing functionality such as, for example, example-based stylization of 3D renderings using illumination-guided texture synthesis.

The image service 110 is illustrated as including an image synthesis module 112 and an error control module 114. The image synthesis module 112 is representative of functionality to synthesize an image using illumination-guided example-based stylization, based on example images 116 stored in storage 118. For instance, the image synthesis module 112 is configured to synthesize an image of a target scene using illumination information from an exemplar image having an artistic stylization of a 3D rendering. The image synthesis module 112 is further configured to determine light propagation information associated with the exemplar image and additional light propagation information associated with a 3D rendering of a target scene. Using the light propagation information as guidance, the artistic stylization from the exemplar image is transferred to the target scene to visually stylize the target scene according to the artistic stylization of the exemplar image.

The error control module 114 is representative of functionality to control patch-usage during texture synthesis associated with generating the new image. In implementations, the error control module 114 is configured to determine matching errors of potential source-to-target patches, and calculate an error budget based on a curve fitted to a sorted set of the matching errors. The error budget can be used to encourage uniform patch-usage (e.g., each source patch being used an equal number of times) while also being adaptable to content within the target scene to allow non-uniform patch-usage (e.g., different source patches having comparatively different numbers of patch assignments). Further discussion of these and other aspects are provided below in more detail.

Although the storage 118 is illustrated as a component of the service provider 102, the storage 118 may alternatively be remote from the service provider 102, or may be a third-party database. The storage 118 may be a single database, or may be multiple databases, at least some of which include distributed data. Thus, a variety of different types of storage mechanisms can be utilized for the storage 118.

In implementations, a user interacts with a computing device 104 having a processing system 120 configured to implement a communication module 122 that supports communication via the network 106, such as with the one or more services of the service provider 102. As such, the communication module 122 may be configured in a variety of ways. For example, the communication module 122 may be configured as a browser that is configured to "surf the web." The communication module 122 may also be representative of network access functionality that may be incorporated as part of an application, e.g., to provide network-based functionality as part of the application, an operating system, and so on. Thus, functionality represented by the communication module 122 may be incorporated by the computing device 104 in a variety of different ways.

As part of the communication supported by the communication module 122, one or more of the images 116 may be uploaded to the storage 118 via the network 106. The images 116 stored in the storage 118 can include images that were captured using an image capturing device of a user of the computing device 104, user-created images, images downloaded or copied from one or more sources, 3D renderings of a scene or model, and so on. In implementations, the image capturing device can include a camera or scanner that is integrated with the computing device 104, or that is separate from the computing device 104. Captured, created, downloaded, and/or copied images can also be stored in memory 124 at the computing device 104. Although the memory 124 is illustrated as a component of the computing device 104, the memory 124 may alternatively be remote from the computing device 104. Additionally, the communication module 122 may be configured to communicate with the image service 110 to initiate the image processing functionality for an image.

In alternative implementations, the image processing functionality can be provided by an image processing module 126 implemented by the processing system 120 at the computing device 104. For example, the image processing module 126 is configured to perform a variety of image processing functions, such as illumination-guided example-based stylization of 3D renderings, control of patch-usage during texture synthesis, and so on. In at least one implementation, the image processing module 126 is configured to generate a new image, such as new image 128 displayed via display device 130 of the computing device 104. In this example, the image processing module 126 is configured to generate the new image 128 using light propagation information from an exemplar, such as exemplar image 132 (© Pavla Sýkorová) that includes a stylized appearance of a 3D rendering of a scene in image 134, to transfer the stylized appearance from the exemplar image 132 to a target scene from a target image 136. In this way, the new image 128 depicts the target scene from the target image 136 having the stylized appearance of the exemplar image 132.

Example Implementation

The following discussion describes example implementations of illumination-guided example-based stylization of 3D renderings that can be employed to perform various aspects of techniques discussed herein. The example implementations may be employed in the environment 100 of FIG. 1, the system 900 of FIG. 9, and/or any other suitable environment.

Figure 2:
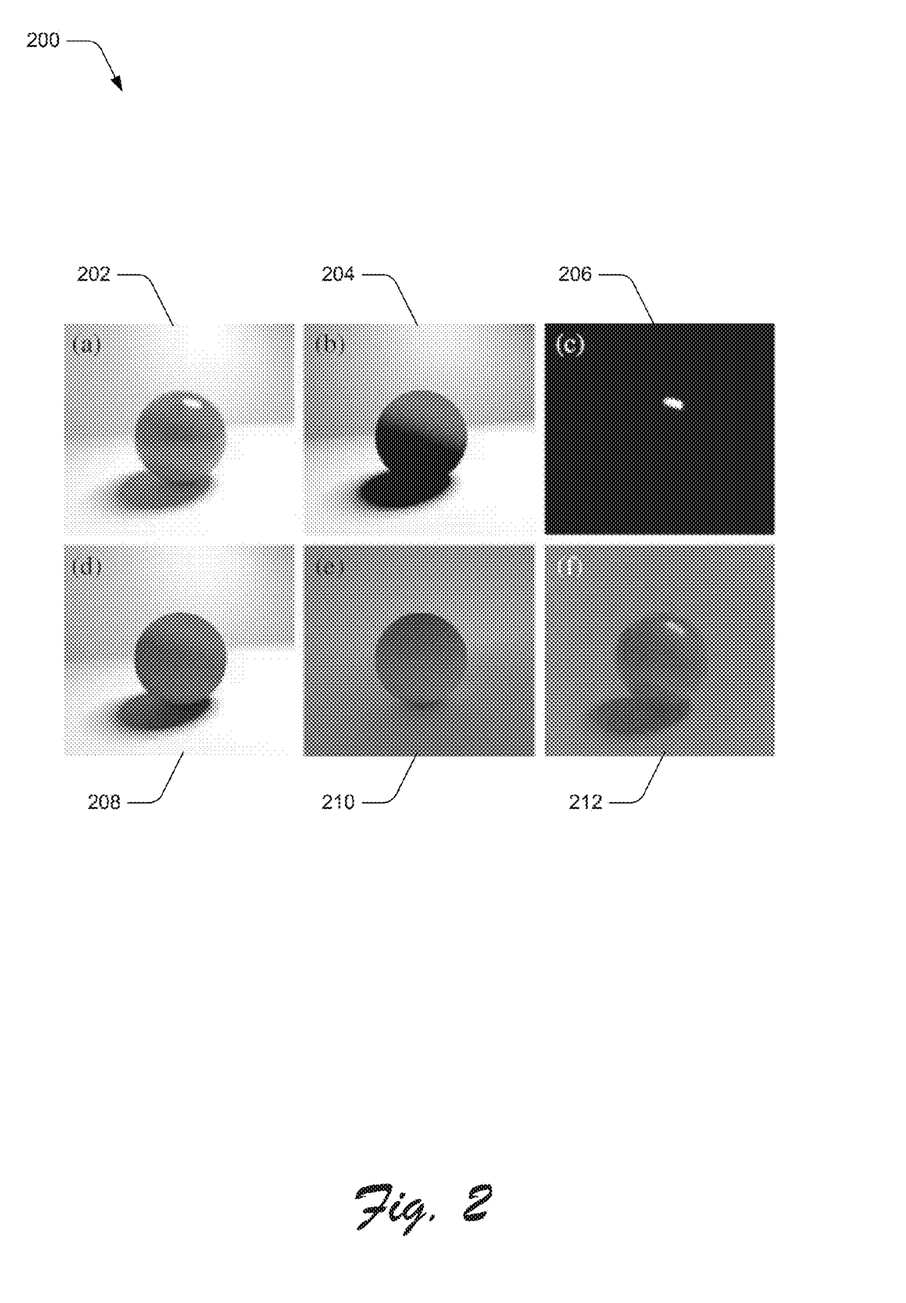
FIG. 2 is an illustration of an example of different channels of a multi-channel image.

FIG. 2 is an illustration of an example 200 of different channels of a multi-channel image. In implementations, light propagation information of a scene can be determined and used as guidance to synthesize a target image, preserving a stylization of individual illumination effects in a source exemplar, such as the multi-channel image shown in the example 200. In light transport, light-surface interactions can generally be classified as either diffuse or specular. Examining interactions that occur on a path between a light source and a sensor allows global illumination effects to be distinguished. This technique, known as Light Path Expressions (LPEs) can be used to filter various illumination effects.

In implementations, a multi-channel image is created for each of the exemplar and the target image. These multi-channel images have channels containing traditional RGB representations and LPE buffers. For example, the multi-channel images each include a full render channel, a style channel, and multiple LPE channels, each of which are described in more detail below. Matching operations are then performed on these multi-channel images. Some example light paths are shown in FIG. 2.

For example, image 202 includes an exemplar rendering of a sphere on a flat surface using a full global illumination rendering. Image 204 exemplifies a direct diffuse (LDE) channel, which represents soft shadows and even gradation from light to dark caused by light emanating from a large light source. Image 206 represents direct specular (LSE), which captures highlights and reflections on a surface of the subject, caused by a point-like light source. Image 208 includes the first two diffuse bounces (LD{1,2}E), which affects shaded areas directly visible by the camera, or specular reflective or refractive surfaces, and also shaded areas used in indirect illumination calculations.

In addition, Image 210 represents diffuse interreflection (L.*DDE), which captures light reflected from objects that are not shiny or specular, and which illuminates the surrounding area. Image 212 represents a hand-drawn style image (© Daicho Ito) that is coarsely aligned with the exemplar rendering in image 202. Here, the image 212 is used in the style channel of the exemplar. Additional channels can be added as necessitated by the give scene. For example, a caustics channel (LS*DE) can be added to represent an envelope of light rays reflected or refracted by a curved surface or object, or a projection of that envelope of light rays on another surface. Accordingly, any number or set of channels can be utilized, and path sets captured in different buffers are not required to be disjoint.

In implementations, the target image includes channels similar to those in the exemplar. The target image, however, initially includes an empty style channel, whereas the style channel of the exemplar includes the image 212. Using the LPE channels as guidance, the empty style channel of the target image is gradually filled with patches from the style channel of the exemplar. Doing so causes a target scene in the target image to be stylized with an artistic stylization similar to that of the style channel in the exemplar.

Figure 3:
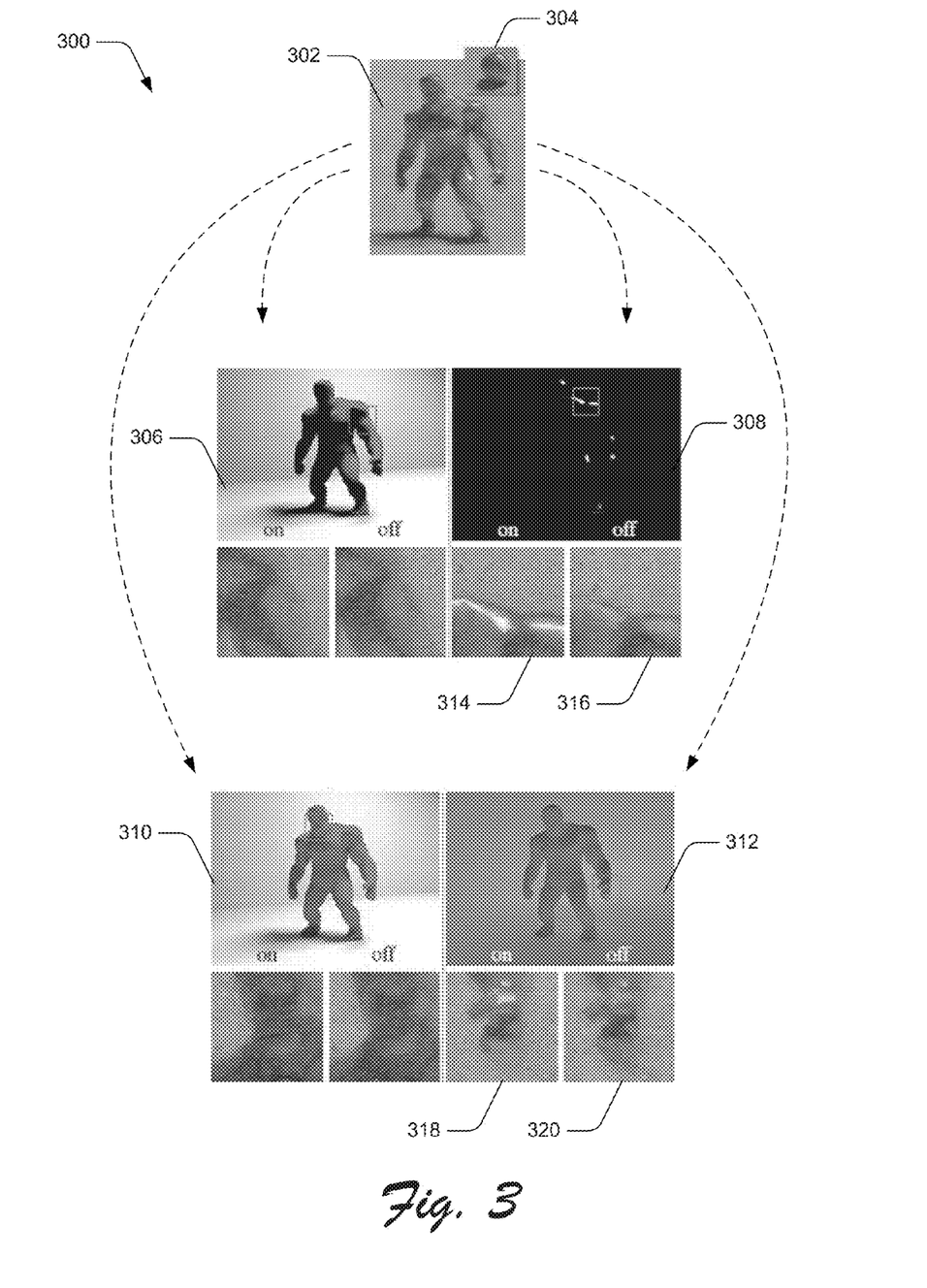
FIG. 3 illustrates an example implementation that is operable to utilize techniques for illumination-guided example-based stylization of a 3D rendering in accordance with one or more embodiments.

FIG. 3 illustrates an example implementation 300 that is operable to utilize techniques for illumination-guided example-based stylization of a 3D rendering in accordance with one or more embodiments. For instance, image 302 represents a final stylization of a 3D rendered model using a style exemplar 304. Image 306 represents a diffuse (LDE) channel, which emphasizes a contrast between lighted areas and shadowed areas. Image 308 represents a specular component (LSE), which provides proper stylization of highlights. Image 310 represents first and second diffuse bounce (LD{1,2}E), which emphasizes details in shadows. Finally, image 312 represents diffuse interreflections (L.*DDE), which emphasizes indirect illumination.

In the illustrated example, each of the images 306-312 are shown with two corresponding sub-images that illustrate the effect of an associated LPE channel in synthesizing image 302 in comparison to not using the associated LPE channel. For instance, consider image 308, which emphasizes highlights using the specular component (LSE). Sub-image 314 illustrates the added visual richness provided by the specular component emphasizing the highlights in contrast to sub-image 316, which was synthesized without using the LSE channel and lacks the added highlights shown in the sub-image 314. Another example includes sub-image 318, which illustrates lighting effects caused by indirect illumination emphasized by the diffuse interreflections channel in comparison to sub-image 320, which was synthesized without using the diffuse interreflections channel and lacks the added lighting effects that are shown in the sub-image 318. Accordingly, a side-by-side comparison of images synthesized with and without particular LPE channels illustrates the added visual richness provided by individual LPE channels.

Figure 4:
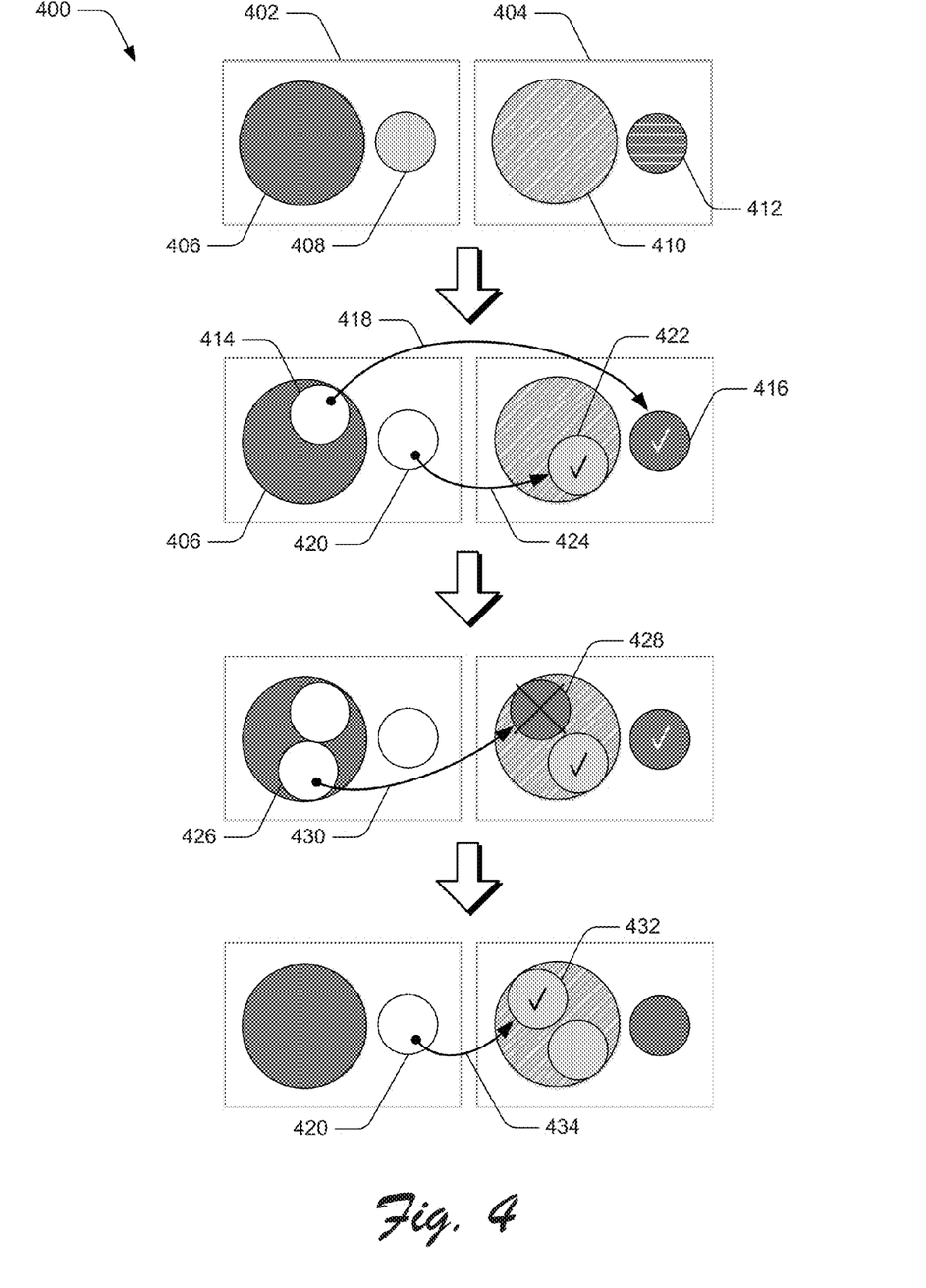
FIG. 4 illustrates an example implementation of adaptive patch utilization enforcement in accordance with one or more embodiments.

FIG. 4 illustrates an example implementation 400 of adaptive patch utilization enforcement in accordance with one or more embodiments. In at least some embodiments, different types of patches have different distributions in a source and a target. For example, the illustrated example includes a source image 402 and a target image 404. The source image 402 includes a large dark circle 406 and a small light gray circle 408. The target image 404 to be synthesized also includes two circles, but with colors opposite to those in the source image 402. For instance, the target image 404 includes a large light gray circle 410 and a small dark circle 412. Accordingly, in this example, the source image 402 includes a comparatively larger amount of dark color than the light gray color, whereas the target image 404 requires a comparatively larger amount of light gray color than the dark color.

Uniformity-preserving techniques can initially transfer source patches to proper locations in the target. For example, source patch 414 from the large dark circle 406 is used to fill target patch 416, which represents a filled version of the small dark circle 412 in the target image 404. This transfer is indicated by arrow 418. Further, an additional source patch 420 is taken from the small light gray circle 408 in the source image 402 and used to fill target patch 422 with the light gray color, as indicated by arrow 424. Here, source patches 414 and 420 are illustrated in white to indicate that they have been used, since the uniformity-preserving techniques enforce uniform utilization of source patches.

Eventually, all suitable target locations can become occupied, leading conventional uniformity-preserving techniques to force remaining source patches into target positions with high matching error. For instance, source patch 426 can be forced into target patch 428, as indicated by arrow 430, which causes an artifact in the form of the target patch 428 being filled with an incorrect color (e.g., the dark color from the large dark circle 406 in the source image 402). Other examples include forcing a highlight in the target to be filled with non-highlight source patches when the target has comparatively more highlight region than the source.

The techniques described herein detect this erroneous case and restart retrieval of source patches to enable appropriate source patches to be reused to fill remaining suitable positions in the target. For example, source patch 420 can be reused to fill target patch 432 with the light gray color, as indicated by arrow 434. In this example, the light gray color is the correct color for the target patch 432. In this way, excessive use of certain patches is reduced while non-uniform patch-utilization is still permitted. Further details of this and other aspects are discussed with respect to FIG. 5.

Figure 5:
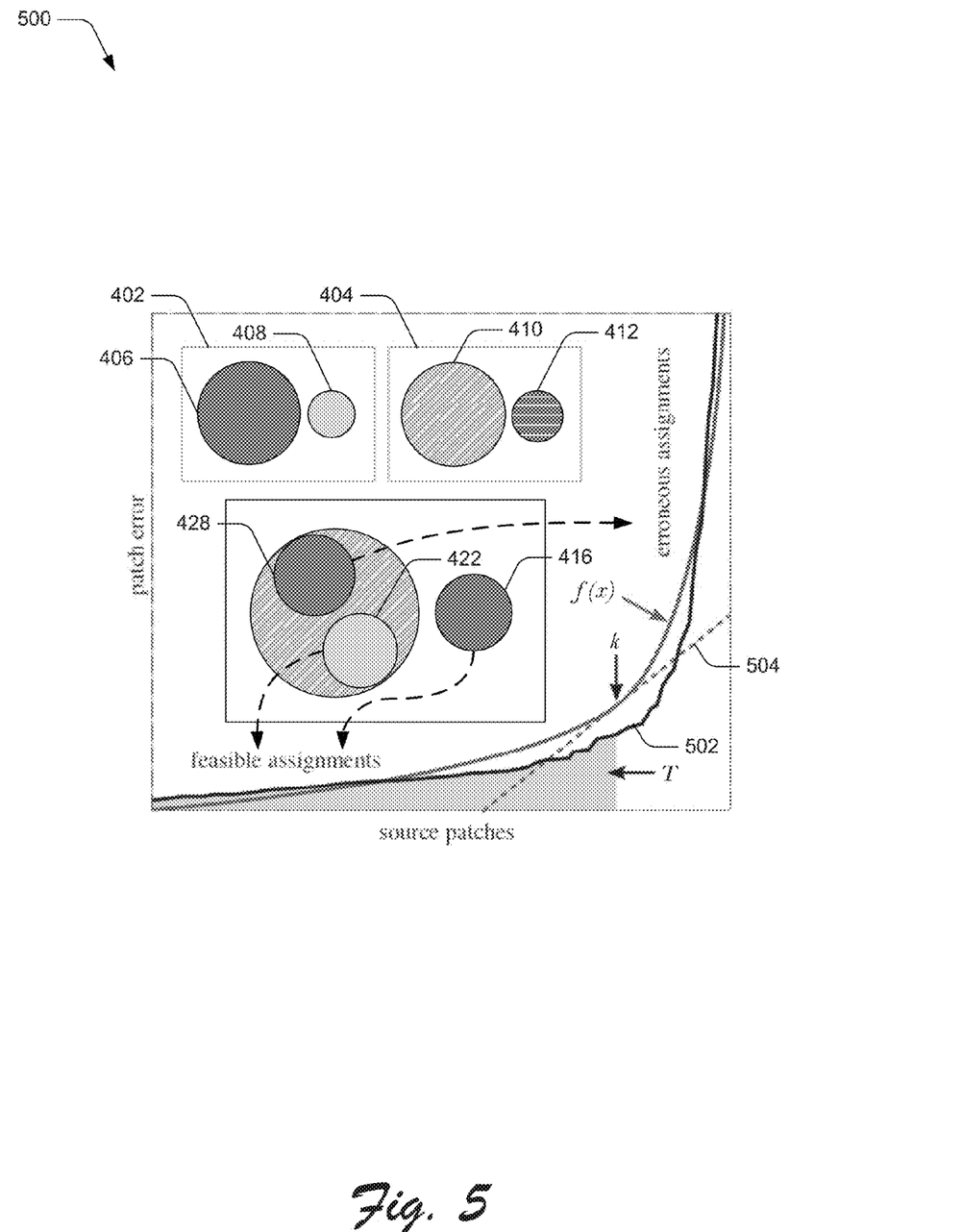
FIG. 5 illustrates an example implementation of techniques for adaptive patch utilization during illumination-guided example-based stylization of 3D renderings in accordance with one or more embodiments.

FIG. 5 illustrates an example implementation of techniques for adaptive patch utilization during illumination-guided example-based stylization of 3D renderings in accordance with one or more embodiments. During image synthesis, matching errors are inspected and instances are detected where patches are being forced into inappropriate locations. FIG. 5 demonstrates an example approach for detecting such instances. In contrast to conventional techniques that attempt to locate for each target a nearest neighbor in the source, the techniques described herein identify for each source patch a nearest neighbor in the target that best matches the source patch. This technique can be referred to as a reversed nearest neighbor field (NNF) retrieval. In this way, uniform patch-usage can be encouraged by locating, for each source patch, a suitable counterpart in the target.

Not all of the source patches, however, are necessarily utilized. To avoid assignment of inappropriate source patches that can cause visual artifacts in the target image, matching error values associated with each potential source-to-target patch assignment are determined. These matching error values are sorted and plotted with normalized axes. Then, a curve is fitted to the sorted and plotted matching error values. In at least some implementations, the fitted curve includes a hyperbolic shape. However, any suitable curve can be utilized.

Continuing with the example from FIG. 4, FIG. 5 illustrates matching error values 502 that are associated with potential source-to-target patch assignments from the source image 402 to the target image 404, and which are sorted and plotted on normalized axes. Some source-to-target patch assignments are associated with a relatively small matching error, representing a feasible assignment. One example includes target patch 422 being assigned a source patch having the correct light gray color from the small light gray circle 408 in the source image 402. Another example includes target patch 416 being assigned the correct dark color from the large dark circle 406 in source image 402. Matching errors associated with these two example assignments are relatively low, indicating that these potential assignments are feasible. However, erroneous assignments, such as the target patch 428 that is incorrectly assigned a source patch having the dark color from the large dark circle 406 in the source image 402, have relatively high matching errors. As illustrated, the dark color of the target patch 428 does not match the light gray color intended for the large light gray circle 410 of the target image 404.

A hyperbolic curve $f(x)=(a-bx)^{-1}$ is fitted to the matching error values 502 using Trust-Region-Reflective Least Squares method. Variables a and b represent parameters of the hyperbolic curve that are estimated, and x refers to an index in the sorted list of source patches. The curve f(x) includes a knee point k representing a point on the curve where the error starts to rapidly increase. The knee point k can be estimated by determining a point where the curve f(x) has a derivative equal to one (e.g., f'(x)=1). Dashed line 504 represents a line having a slope equal to one. The following equation can be used to estimate the knee point k:

$$k = \sqrt{\frac{1}{b} + \frac{a}{b}} \qquad \text{Equation 1}$$

Patches with indices above the knee point k are likely erroneous assignments that should be avoided. Then, a feasible error budget T is set that represents an integral of the patch errors with indices below the knee point k. Using the error budget T, the original source-to-target patch assignments are modified to maximize the number of used source patches while also satisfying an additional feasibility constraint that is represented by the following equation:

$$\sum_{p \in A^*} \min_{q \in B} E(A^*, B, p, q, \mu) < T \qquad \text{Equation 2}$$

In Equation 2, the term A* refers to a portion of the source image that contains feasible patches that can be assigned to the target image B, such as target patches 416 and 422. In addition, A*=(A, A') and B=(B, B') are multi-channel images containing full render with LPE channels A and B, style exemplar A', and current synthesis result B'. The term p represents a pixel in a source multi-channel image A* (e.g., source image 402), the term q refers to a pixel location in the target image B (e.g., the target image 404). The term μ refers to a weight that controls the influence of individual guidance channels. In implementations, for each patch around pixel p within the source image, a corresponding or best matching patch around pixel q is found in the target image, such that an error E is minimized, where the error E is represented by the following equation:

$$E(A,B,p,q)=\|A'(p)-B'(q)\|^2+\mu\|A(p)-B(q)\|^2 \qquad \text{Equation 3}$$

To perform the actual synthesis, a standard algorithm from previous works can be used, which relies on techniques similar to an Expectation-Maximization (EM) algorithm. For instance, the core of the standard algorithm is an EM-like iteration, having an E-step in which correspondent source patches are retrieved for each target patch (target-to-source NNF retrieval). Then, in an M-step of the EM-like iteration, overlapping pixels in target patches are averaged. This EM-like iteration is executed multiple times over an image pyramid from coarse to fine scale. The E-step where the target-to-source NNF is retrieved, however, is modified by the patch retrieval process described above with respect to FIG. 5.

Using the feasibility constraint during patch assignments can result in some target patches remaining unassigned. Unassigned patches, however, can be desirable in situations where assigning them would introduce artifacts. The process of retrieving or assigning patches is then repeated iteratively to enable at least some source patches having feasible assignments to be reused to cover remaining unassigned positions in the target image. When the process is repeated, however, it is repeated only for those unassigned patches. Although each individual iteration enforces uniform patch-usage, multiple iterations collectively allow a source patch to be assigned to multiple positions in the target image because each subsequent iteration can reuse source patches used in previous iterations, thus causing some source patches to be used comparatively more times than other source patches (e.g., non-uniform patch-usage). In some cases, subsequent iterations use relatively smaller patch sizes than previous iterations. Using multiple iterations maximizes the number of assigned source patches while the integral of the matching errors of the assigned source patches is lower than the integral T of matching errors estimated in the initial iteration using the knee point on the fitted curve.

In implementations, this iterative scheme stops when all target patches are covered. Alternatively, the iterative scheme can stop prior to covering all the target patches (e.g., when 95% are covered) and use standard target-to-source nearest-neighbor retrieval techniques on remaining unassigned patches (e.g., final 5% of the patches). This decreases processing times and discards high error locations in the target image. In implementations, these high error areas can thus be filled with flat patches, but since this includes only about 5% of the pixels in this example, the flat patches may not be visible to the human eye.

The number of iterations can depend on the structure of the target scene and the complexity of the exemplar image. In some cases, ten iterations may be sufficient to cover more than 80% of the target patches. In at least some implementations, however, the number of iterations is roughly proportional to the ratio of the areas of corresponding illumination effects in the source and target images. For example, if the source image contains one highlight and the target image has four highlights of similar size, then at least four iterations can be used to cover the four highlights. Different structures of individual illumination effects can, however, increase the number of iterations due to increased complexities.

Figure 6:
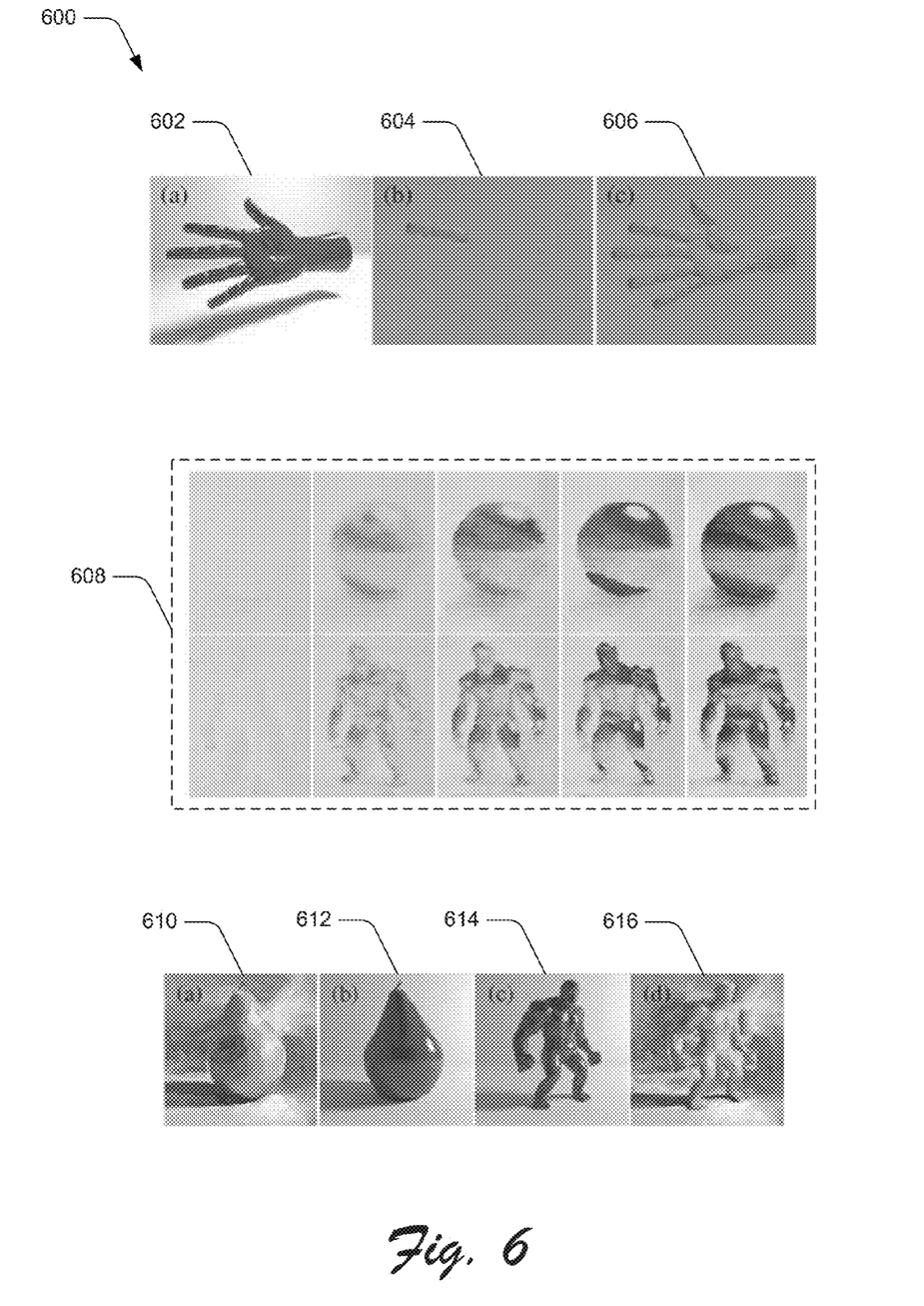
FIG. 6 illustrates example implementations utilizing techniques for illumination-guided example-based stylization of 3D renderings.

FIG. 6 illustrates example implementations 600 utilizing techniques for illumination-guided example-based stylization of 3D renderings. In implementations, autocomplete shading can be implemented using the techniques described herein. For example, a source model 602 of a hand is rendered using full global illumination rendering. Then, an artist creates a stylization of a portion of the source model 602, such as by drawing shading for one finger of the hand, as shown in image 604 (© Daicho Ito). Then, a stylized image 606 can be synthesized using the stylization of just the finger in image 604 and the hand from the source model 602 to produce a stylized version of the entire hand.

In addition, image series 608 (© Karel Seidl) represents on-the-fly shading. Here, the artist paints a simple scene including a sphere on a table, as illustrated in the top row of the image series 608 beginning on the left and progressing to the right. While the artist is painting the scene, the stylization of the scene is continuously transferred in real time to the target model, as illustrated in the bottom row of the image series 608. Such continuous feedback helps to gradually improve the final stylization.

In at least some implementations, the artistic style can be transferred to a target image when a reference 3D model is not available. For instance, image 610 (© Tina Wassel Keck) includes a painting of a pear. Using this, an approximate 3D reconstruction 612 is created and lighted to roughly capture illumination conditions in the painting. Then a target model 614 is rendered having lighting conditions that substantially match lighting conditions of the 3D reconstruction, and a new image 616 is synthesized by transferring the style of the painting to the target model 614.

Example Procedures

The following discussion describes techniques for illumination-guided example-based stylization of 3D renderings that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 7:
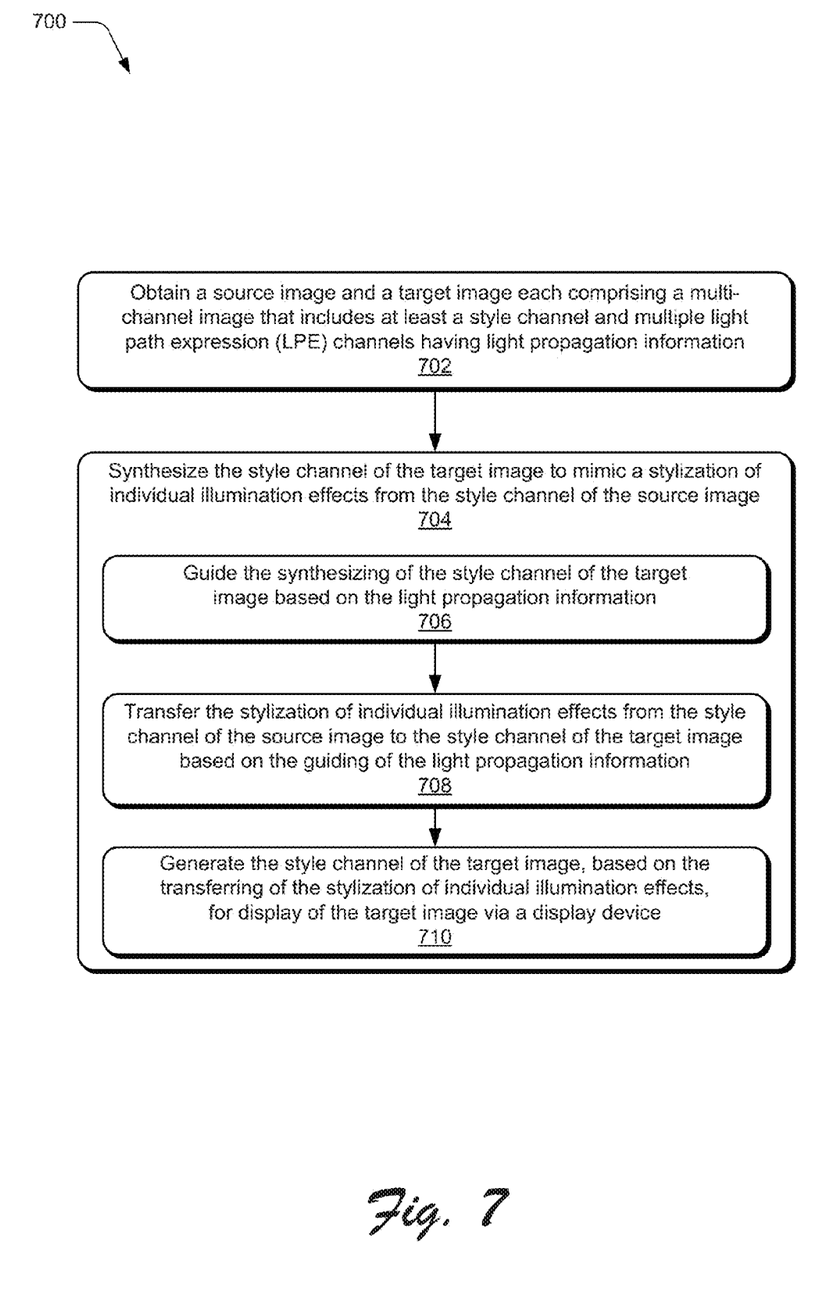
FIG. 7 is a flow diagram depicting a procedure in an example implementation in which techniques for illumination-guided example-based stylization of 3D renderings are utilized.

FIG. 7 is a flow diagram depicting a procedure 700 in an example implementation in which techniques for illumination-guided example-based stylization of 3D renderings are utilized. In implementations, a source image and a target image are obtained, where each multi-channel image includes at least a style channel and multiple light path expression (LPE) channels having light propagation information (block 702). The light propagation information captures different types of illumination effects of a scene, examples of which are described above.

The style channel of the target image is synthesized to mimic a stylization of individual illumination effects from the style channel of the source image (block 704) by at least performing operations described in blocks 706-710. For instance, the synthesizing of the style channel of the target image is guided based on the light propagation information (block 706). Based on guiding of the light propagation information, the stylization of individual illumination effects from the style channel of the source image is transferred to the style channel of the target image (block 708). Then, the style channel of the target image is generated, based on the transferring of the stylization of individual illumination effects, for display of the target image via a display device (block 710).

Figure 8:
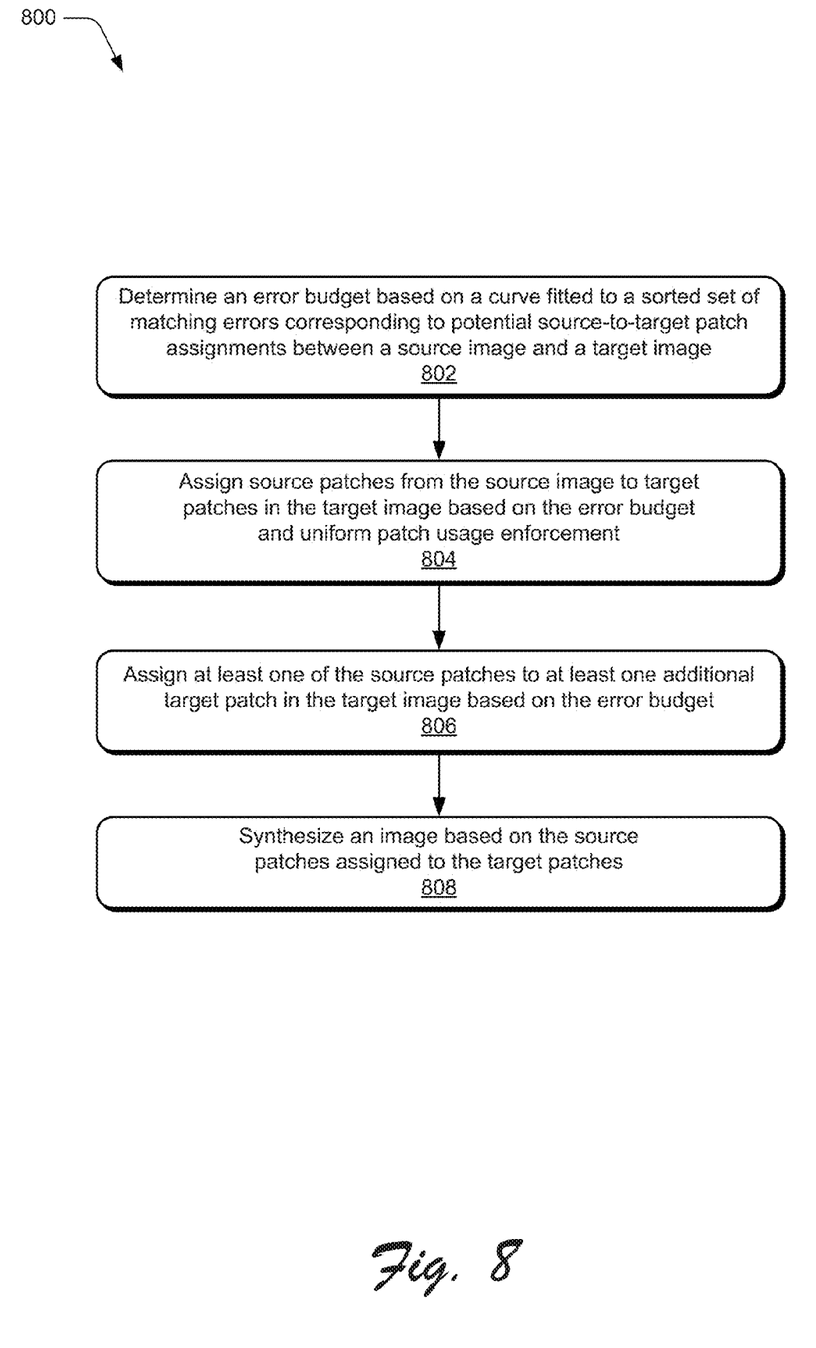
FIG. 8 is a flow diagram depicting a procedure in an example implementation in which techniques for illumination-guided example-based stylization of 3D renderings are utilized.

FIG. 8 is a flow diagram depicting a procedure 800 in an example implementation in which techniques for illumination-guided example-based stylization of 3D renderings are utilized. In implementations, the procedure described in FIG. 8 can be implemented as part of the synthesis of the style channel of the target image in FIG. 7 in order to control errors and minimize artifacts in the target image.

An error budget is determined based on a curve fitted to a sorted set of matching errors that correspond to potential source-to-target patch assignments between the source image and the target image (block 802). For instance, the matching errors are calculated, sorted, and plotted. Then, a hyperbolic curve is fitted to the sorted matching errors, and a position of a knee point on the hyperbolic curve is estimated. The error budget is determined based on an integral of a subset of the matching errors having values below the knee point of the hyperbolic curve. In implementations, the error budget represents a feasibility constraint usable to identify feasible patch assignments from the potential source-to-target patch assignments.

Based on the error budget and uniform patch-usage enforcement, patches from the source image are assigned to target patches in the target image (block 804). By using the error budget during patch assignments, some of the patches may remain unassigned. Then, at least one of the assigned patches from the source image is assigned to at least one additional target patch the target image based on the error budget (block 806). In implementations, this assignment step uses a largest possible subset of the source patches of which a sum of corresponding matching errors is lower than the error budget. In this way, some of the assigned patches from the source patches are assigned to multiple target patches, while other assigned patches from the source patches may have only one patch assignment. These additional patch assignments are made to cover unassigned positions in the target image.

Once the unassigned positions in the target image are covered, an image is synthesized based on source patches assigned to the target patches (block 808). In implementations, the synthesized image includes a stylized appearance of a scene from the target image, where the stylized appearance is stylized according to an artistic stylization from the source image. As described above, the synthesized image is included in the style channel of the target image, and the synthesized image is synthesized based on source patches located in the style channel of the source image.

Example System and Device

Figure 9:
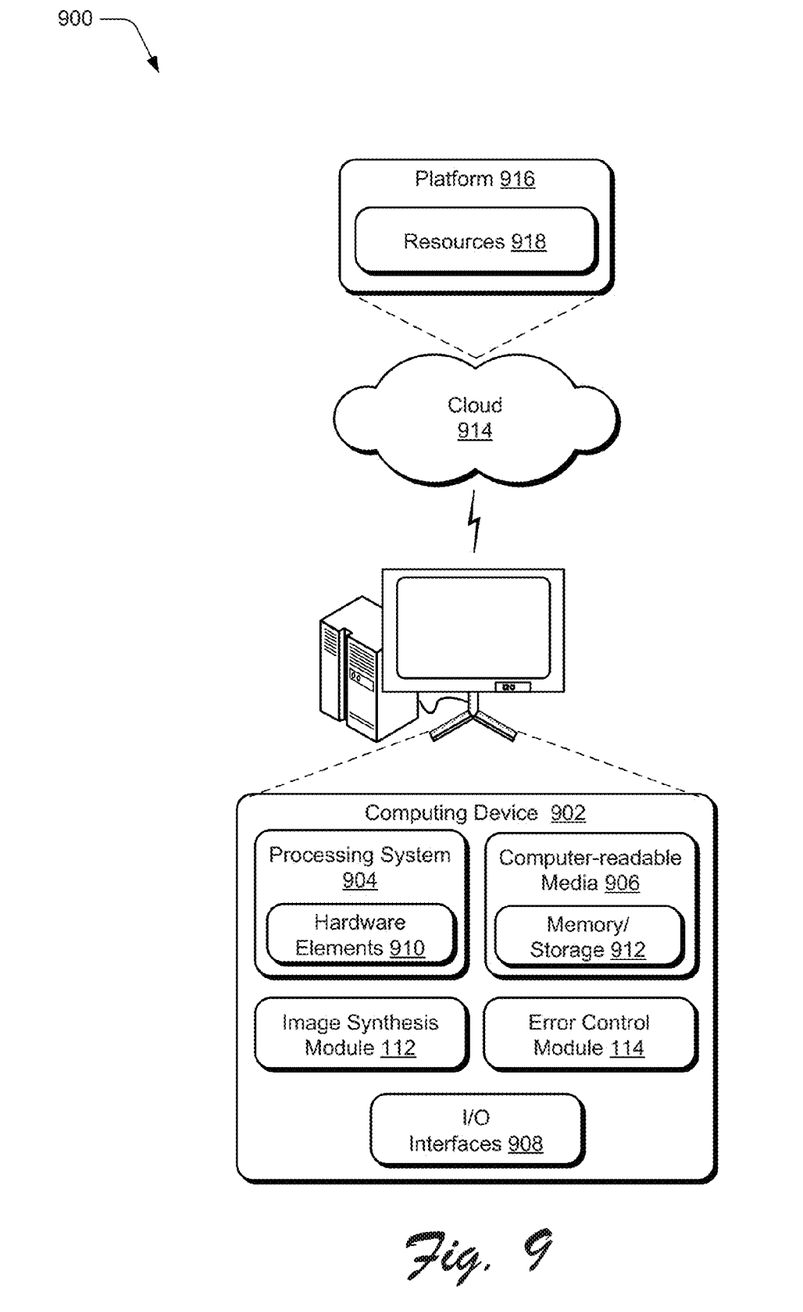
FIG. 9 illustrates various components of an example device that can be implemented as any type of computing device as described herein to implement the techniques described herein.

FIG. 9 illustrates an example system generally at 900 that includes an example computing device 902 that is representative of one or more computing systems and/or devices that may implement the various techniques described herein. This is illustrated through inclusion of image synthesis module 112 and the error control module 114. The image synthesis module 112 may be configured to synthesize an image using illumination-guided example-based stylization techniques. The error control module 114 may be configured to control patch-usage during texture synthesis associated with generating the new image. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

Cloud 914 includes and/or is representative of a platform 916 for resources 918. Platform 916 abstracts underlying functionality of hardware (e.g., servers) and software resources of the cloud 914. Resources 918 may include applications and/or data that can be utilized while computer processing is executed on servers that are remote from the computing device 902. Resources 918 can also include services 920 provided over the Internet and/or through a subscriber network, such as a cellular or Wi-Fi network.

Platform 916 may abstract resources and functions to connect computing device 902 with other computing devices. Platform 916 may also serve to abstract scaling of resources to provide a corresponding level of scale to encountered demand for resources 918 that are implemented via platform 916. Accordingly, in an interconnected device implementation, implementation of functionality described herein may be distributed throughout system 900. For example, the functionality may be implemented in part on computing device 902 as well as via platform 916 that abstracts the functionality of cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control patch-usage in image synthesis based on matching errors associated with potential source-to-target patch assignments between a source image and a target image, a method comprising:
   determining an error budget using a curve fitted to a sorted set of the matching errors, the error budget being usable to identify feasible patch assignments from the potential source-to-target patch assignments;
   assigning source patches from the source image to target patches in the target image using the error budget and uniform patch-usage enforcement;
   assigning at least one of the source patches to at least one additional target patch in the target image based on the error budget; and
   synthesizing an image based on the source patches assigned to the target patches.

2. A method as recited in claim 1, wherein a best-matched target patch is retrieved for each source patch.

3. A method as recited in claim 1, wherein the curve comprises a hyperbolic curve, and the method further comprises estimating a position of a knee point on the hyperbolic curve, the knee point representing a value usable to identify feasible patch assignments from the potential source-to-target patch assignments.

4. A method as recited in claim 3, wherein the error budget is determined based on an integral of a subset of the matching errors that have values below the knee point.

5. A method as recited in claim 1, wherein the synthesized image includes a scene from the target image that is stylized according to a stylization of illumination effects in the source image.

6. A method for controlling patch-usage in image synthesis based on matching errors of potential source-to-target patch assignments between a source image and a target image, the method comprising:
   determining an error budget based on a curve fitted to a sorted set of the matching errors;
   performing multiple iterations of assigning source patches from the source image to target patches in the target image based on the error budget and uniform patch-usage enforcement, at least one of the source patches assigned in an initial iteration being reused in a subsequent iteration to cover unassigned positions in the target image; and
   synthesizing an image based on the assigned source patches, the image having a stylized appearance of a scene from the target image, the stylized appearance including an artistic stylization from the source image.

7. A method as recited in claim 6, wherein:
   the target image comprises a multi-channel image having at least a style channel and multiple light path expression channels; and
   the image is synthesized as the style channel of the target image.

8. A method as recited in claim 6, further comprising:
   estimating a position of a knee point on the fitted curve; and
   setting the error budget as an integral of a subset of the matching errors that include errors having values below the knee point, wherein the assigning source patches includes assigning a largest possible subset of the source patches of which a sum of corresponding matching errors is lower than a value of the error budget.

9. A method as recited in claim 6, wherein a best-matched target patch from the target image is retrieved for each source patch from the source image.

10. A method as recited in claim 6, wherein the source image includes an artistic stylization of a partial scene in comparison to an entire scene from the target image, and the synthesized image includes a stylized appearance of the entire scene from the target image.

11. A method as recited in claim 6, wherein a subsequent iteration of the assigning operation is performed using a first subset of the source patches that are relatively smaller in size in comparison to a second subset of the source patches that were used in an initial iteration of the assigning operation.

12. A method as recited in claim 6, wherein the error budget is an integral of a subset of the matching errors that include errors having values below a knee point on the curve.

13. In a digital medium environment to control patch-usage in image synthesis based on matching errors associated with potential source-to-target patch assignments between a source image and a target image, a system comprising:
   at least one processor: and
   at least one computer-readable storage media storing instructions that are executable by the at least one processor to implement an image synthesis module configured to:
   determine an error budget based on a curve fitted to a sorted set of the matching errors, the error budget representing a feasibility constraint usable to identify feasible patch assignments from the potential source-to-target patch assignments;

assign source patches from a source style channel of the source image to target patches in a target style channel of the target image using the error budget to control usage of the source patches according to uniform patch-usage enforcement;

assign at least one of the source patches to at least one additional target patch in the target style channel based on the error budget; and synthesize the target style channel using the source patches assigned to the target patches, the target style channel having a target scene that is stylized according to a stylization from the source style channel.

14. A system as recited in claim 13, wherein the curve comprises a hyperbolic curve, and the image synthesis module is further configured to estimate a position of a knee point on the hyperbolic curve to represent a value usable to identify feasible patch assignments from the potential source-to-target patch assignments.

15. A system as recited in claim 13, wherein the error budget is an integral of a subset of the matching errors that include errors having values below a knee point on the curve.

16. A system as recited in claim 13, wherein the at least one of the source patches is reused to cover at least one unassigned target patch in the target style channel.

17. A system as recited in claim 13, wherein:

the source patches are assigned during an initial iteration of patch assignments;

the at least one of the source patches is assigned during a subsequent iteration of patch assignments that is constrained to uniform patch-usage; and the initial iteration and the subsequent iteration collectively cause the at least one of the source patches to be assigned to multiple target patches in the target style channel of the target image.

18. A system as recited in claim 17, wherein the subsequent iteration uses a first subset of the source patches that are relatively smaller than a second subset of source patches used in the initial iteration of patch assignments.

19. A system as recited in claim 13, wherein a best-matched target patch in the target image is retrieved for each source patch in the source image.

20. A system as recited in claim 13, wherein the source image includes a stylization of a partial scene in comparison to an entire scene from the target image, and wherein the additional image includes the entire scene from the target image that is stylized according to the stylization of the partial scene from the source image.

* * * * *